United States Patent [19]

Welch

[11] Patent Number: 5,486,747
[45] Date of Patent: Jan. 23, 1996

[54] GENERAL PURPOSE MOTOR CONTROLLER

[75] Inventor: David W. Welch, Columbus, Miss.

[73] Assignee: United Technologies Motor Systems, Columbus, Miss.

[21] Appl. No.: 99,669

[22] Filed: Jul. 29, 1993

[51] Int. Cl.[6] .................................................. H02P 5/28
[52] U.S. Cl. ......................... 318/811; 388/804; 388/811; 318/569
[58] Field of Search .................................... 318/811, 569, 318/567, 600; 388/804, 811

[56] References Cited

U.S. PATENT DOCUMENTS 4,994,950  2/1991  Gritter ..................................... 318/811

Primary Examiner—William M. Shoop, Jr.
Assistant Examiner—Karen Masih
Attorney, Agent, or Firm—Robert E. Greenstien

[57] ABSTRACT

A general purpose or universal motor control is constructed as integrated circuit using a plurality of state machines and memories. The specific characteristics of a motor are programmed into a programmable "features" memory. A lookup table contains parameters for operating the motor that are accessed as a function of the features. The features memory and the lookup table may be programmed and tested through a communications state machine. External and internal pulse width modulation is provided along with dynamic braking as options that are utilized by the state machines depending upon the features. A multiplexer acts a switch between the state machines, the memories and the motor drive.

21 Claims, 10 Drawing Sheets

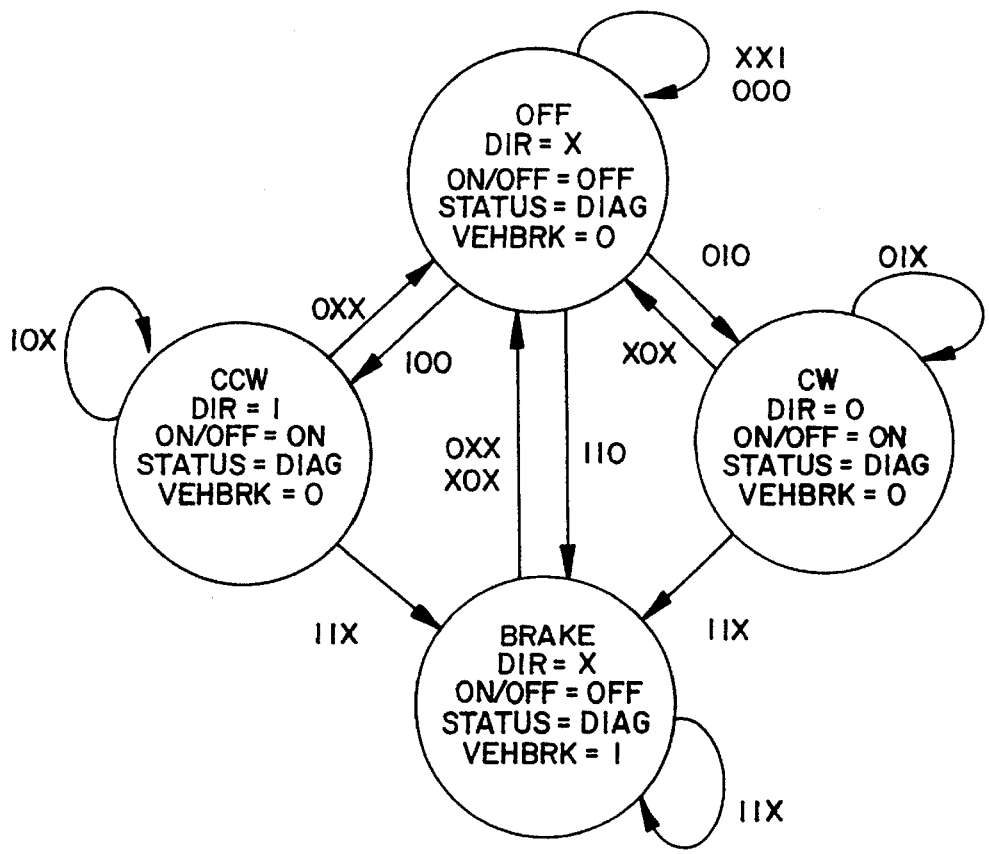
FIG. 5A VEHICLE STATE DIAGRAM
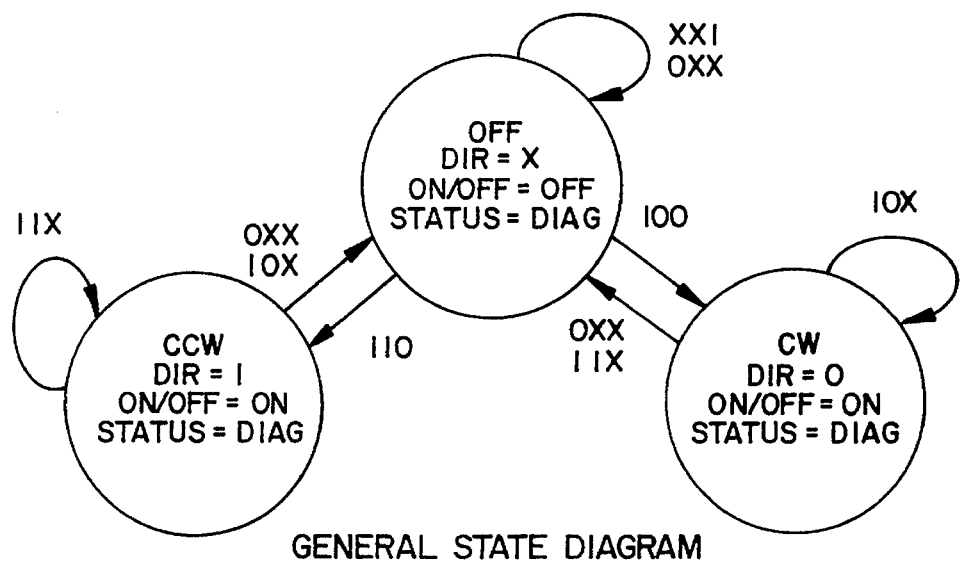
FIG. 5B GENERAL STATE DIAGRAM

DYNAMIC BRAKE STATE DIAGRAM

MULTIPLEX STATE DIAGRAM

COMMUTATION BLOCK

| INPUTS | | | | | | | OUTPUTS | | | | | |
|---|---|---|---|---|---|---|---|---|---|---|---|---|
| MC<2> | MC<1> | MC<0> | DIR | CI<2> | CI<1> | CI<0> | AH | BH | CH | AL | BL | CL |
| 1 | 1 | 0 | 0 | 0 | 0 | 0 | 0 | 0 | 0 | 0 | 0 | 0 |
| 1 | 1 | 0 | 0 | 1 | 0 | 0 | 0 | 0 | 1 | 0 | 1 | 0 |
| 1 | 1 | 0 | 0 | 0 | 1 | 0 | 0 | 1 | 0 | 1 | 0 | 0 |
| 1 | 1 | 0 | 0 | 1 | 1 | 0 | 0 | 0 | 1 | 1 | 0 | 0 |
| 1 | 1 | 0 | 0 | 0 | 0 | 1 | 1 | 0 | 0 | 0 | 0 | 1 |
| 1 | 1 | 0 | 0 | 1 | 0 | 1 | 1 | 0 | 0 | 0 | 1 | 0 |
| 1 | 1 | 0 | 0 | 0 | 1 | 1 | 0 | 1 | 0 | 0 | 0 | 1 |
| 1 | 1 | 0 | 0 | 1 | 1 | 1 | 0 | 0 | 0 | 0 | 0 | 0 |
| 1 | 1 | 0 | 1 | 0 | 0 | 0 | 0 | 0 | 0 | 0 | 0 | 0 |
| 1 | 1 | 0 | 1 | 1 | 0 | 0 | 0 | 1 | 0 | 0 | 0 | 1 |
| 1 | 1 | 0 | 1 | 0 | 1 | 0 | 1 | 0 | 0 | 0 | 1 | 0 |
| 1 | 1 | 0 | 1 | 1 | 1 | 0 | 1 | 0 | 0 | 0 | 0 | 1 |
| 1 | 1 | 0 | 1 | 0 | 0 | 1 | 0 | 0 | 1 | 1 | 0 | 0 |
| 1 | 1 | 0 | 1 | 1 | 0 | 1 | 0 | 1 | 0 | 1 | 0 | 0 |
| 1 | 1 | 0 | 1 | 0 | 1 | 1 | 0 | 0 | 1 | 0 | 1 | 0 |
| 1 | 1 | 0 | 1 | 1 | 1 | 1 | 0 | 0 | 0 | 0 | 0 | 0 |
| 1 | 1 | 1 | 0 | 0 | 0 | 0 | 0 | 0 | 0 | 0 | 0 | 0 |
| 1 | 1 | 1 | 0 | 1 | 0 | 0 | 0 | 0 | 1 | 0 | 1 | 0 |
| 1 | 1 | 1 | 0 | 0 | 1 | 0 | 0 | 1 | 0 | 1 | 0 | 0 |
| 1 | 1 | 1 | 0 | 1 | 1 | 0 | 0 | 0 | 1 | 1 | 0 | 0 |
| 1 | 1 | 1 | 0 | 0 | 0 | 1 | 1 | 0 | 0 | 0 | 0 | 1 |
| 1 | 1 | 1 | 0 | 1 | 0 | 1 | 1 | 0 | 0 | 0 | 1 | 0 |
| 1 | 1 | 1 | 0 | 0 | 1 | 1 | 0 | 1 | 0 | 0 | 0 | 1 |
| 1 | 1 | 1 | 0 | 1 | 1 | 1 | 0 | 0 | 0 | 0 | 0 | 0 |
| 1 | 1 | 1 | 1 | 0 | 0 | 0 | 0 | 0 | 0 | 0 | 0 | 0 |
| 1 | 1 | 1 | 1 | 1 | 0 | 0 | 0 | 1 | 0 | 0 | 0 | 1 |
| 1 | 1 | 1 | 1 | 0 | 1 | 0 | 1 | 0 | 0 | 0 | 1 | 0 |
| 1 | 1 | 1 | 1 | 1 | 1 | 0 | 1 | 0 | 0 | 0 | 0 | 1 |
| 1 | 1 | 1 | 1 | 0 | 0 | 1 | 0 | 0 | 1 | 1 | 0 | 0 |
| 1 | 1 | 1 | 1 | 1 | 0 | 1 | 0 | 1 | 0 | 1 | 0 | 0 |
| 1 | 1 | 1 | 1 | 0 | 1 | 1 | 0 | 0 | 1 | 0 | 1 | 0 |
| 1 | 1 | 1 | 1 | 1 | 1 | 1 | 0 | 0 | 0 | 0 | 0 | 0 |

THREE PHASE BI-POLAR
WYE AND DELTA MOTOR

*FIG. 9*

GENERAL PURPOSE MOTOR CONTROLLER

TECHNICAL FIELD

This invention relates to DC electric motors, in particular, fractional horsepower electric motors of the type often used in windshield wipers and door window lifters in automobiles, and, more specifically, to controllers for these motors and related techniques for using a single controller to operate DC motors with very different characteristics.

BACKGROUND OF THE INVENTION

DC electric motors take many forms, depending upon application, required performance and cost considerations. The permanent magnet brush/commutator DC motor is widely used. The brushless permanent magnetic motor is becoming popular, mainly because it offers enhanced, consistent performance, lacking the brushes that wear out over time and produce RFI. On the other hand, a brushless motor uses electronic (solid state) controls to synthesize the commutation effect, adding cost and complexity to some degree. The operation of brushless motors is well known. Hall effect devices or other detectors are used to sense field orientation as the rotor rotates. Semiconductor switches (e.g. junction transistors) may be used to switch/regulate the "high side" and "low side" field currents in the motor.

DC motors are proliferating in the typical automobile as automobiles increasingly include more powered features. These motors are used for windshield wipers, for each electrically operated window, for door locks, for hood and trunk locks, for sunroof operators, for blowers, and for active suspensions, just to name a few applications. They are also used for radiator and air conditioning condenser fans. Each application calls for a motor with a specific operating characteristic and a tailored drive, the system by which power is applied from the vehicle supply to the motor. Some motors may have multiple speeds; some may operate at constant speed; some may have to reverse; some may be brush type or brushless; and some may use dynamic braking in different forms to rapidly slow the motor.

The interface between the motor and the operator therefore can add considerably to vehicle cost if each motor must have its own motor controller. Traditionally, each motor has had a customized controller or interface. Considering the number of possible motors that can be present in a vehicle, such as an automobile, this increases the cost substantially. Adding to the cost, power to each motor is routed through power from the supply through a switch.

DISCLOSURE OF THE INVENTION

An object of the present invention is to provide an universal motor controller or "general purpose motor controller" (GPMC).

An object of the present invention is to provide a way that minimizes the size and number of power cables supplying power to a motor.

Still another object is to provide a system that can be fabricated on a single substrate during the semiconductor fabrication process.

A particular object is to provide a GPMC that can control a very wide variety of DC motors of the 3-phase and 2-phase brushless, brush, unidirectional and bidirectional motor types with and without dynamic braking.

Another object is to provide a GPMC or universal motor control that can control a number of motor functions such a braking, automatic or commanded dynamic braking and speed control by analog or digital control.

According to one aspect of the invention, a motor features register or memory is programmed to identify the specific characteristics of a motor controlled by the GPMC. The GPMC contains all the active components needed to control any of the motors. Depending on what is programmed into the features register, different semiconductor function blocks on the GPMC are used and the operation is controlled actively to provide the type motor operation associated with the stored features.

According to one aspect to the invention, the features register is programmed over a multiplexing data path that also controls information flow through other parts of the GPMC.

According to the invention, the state of two input control signals define motor direction and state and these signals are supplied as inputs to a block containing several state machines, each capable of providing a specific form of motor control. Whether operation takes place with a particular state machine is determined by the binary state of those signals and their timing. This gives the GPMC the capacity to operate under the control of a system controller, e.g. a vehicle controller, or simple operation with a dedicated switch, providing not just on and off control but also dynamic braking depending upon what is in the features register.

According to the invention, the function blocks, such as pulse width modulators (PWM), which may be analog and digital, and such as a motor braking and commutation blocks, are controlled based on actual motor operation through the used of signal processing circuits that are fabricated with the GPMC as "unitary solid state device" in effect; that is all the semiconductor components are doped and assembled in the same "FAB" process. These circuits—"state machines"—rapidly provide and alter motor control signals depending upon instantaneous operating signals, their states depending on the motor's features. The way in which the features register is programmed determines the available states for the state machines and thereby automatically configures the operation of the GPMC to the motor, leading to the desired type of motor operation. The availability of different "states" and the features register makes it possible to configure the GPMC for multiplexed control in a vehicle; i.e., the control can be operated from a common bus over which it receives operational signals.

Among the numerous benefits and features of the invention is that it provides a device that can be manufactured as a single solid state product awaiting specific programming of the features register to match it to a particular motor type. An especially attractive feature, the same solid state product can be used throughout a vehicle. In contrast, conventional controllers are hard-wired devices with custom components for controlling the motor to which the controller is connected. The present invention achieves the advantage of using one controller for different motors and the capability to reconfigure the controller without modifying hardware for a different type of motor. This is attractive in that it makes it very easy to modify an existing motor design for vehicle or use a different motor, perhaps with more power, without the need to redesign and build a suitable controller. For the motor manufacturer, this speeds-up design and manufacture of custom motor designs.

The following discussion of the invention will demonstrate other benefits and features of the inventions to one skilled in the art.

BRIEF DESCRIPTION OF THE DRAWINGS

FIGS. 5A and 5B are state diagrams for a state machine incorporated in the communication block shown in FIG. 2.

FIG. 9 is a truth table for the truth table functionally shown in FIG. 9.

FIG. 11 is a data table for the SAR (successive approximation register) shown in FIG. 4.

BEST MODE FOR CARRYING OUT THE INVENTION

The preferred embodiment of the present invention is single integrated circuit in which all the logic and drive functions are manufactured in the same semiconductor fabrication ("FAB") process. Seen in that context, the use of algorithmic "state machines" or "ASMs", which are large scale programmable logic arrays, are especially appealing. State machines, which will be discussed in some detail below relative to overall system design, are not new. For the most part, a typical microprocessor based system is a synchronous device where signal processing follows program steps and loops that are entered and exited in synchronism with a processor clock. a state machine, however, has defined operating states based on input signal levels, making it much faster than a microprocessor because a microprocessor must access and operate under its program instructions. A representative discussion of the design of ASMs may be found in H. Lam, J. O'Malley, FUNDAMENTALS OF COMPUTER ENGINEERING (1988). In the context of the following discussion of a motor control embodying the invention, "state diagrams" are shown to illustrate the discrete states that various state machines in the control may assume. Understanding the specific states is considered less important than appreciating that, in the context of the entire system, state machines are used to effect certain known motor operations and that the machines are, at any time, in certain binary states awaiting changes in signals provided to the system or by other state machines. Also, in some situations not all the states are used, due to the particular feature of the motor connected to the GPMC. In principle, the same operations may be carried out with a real time microprocessor based system operating under a repetitive program, but such a system would be more complex, slower and more expensive to fabricate, besides not being particularly adaptable to manufacture in a single semiconductor manufacturing process because of the special fabrication techniques required to construct microprocessors and their peripherals. For instance, the voltage rating on the GPMC can be higher than a system built around a microprocessor engine, making it easier to fabricate the GPMC in one fabrication (e.g. doping) process.

Figure 1:
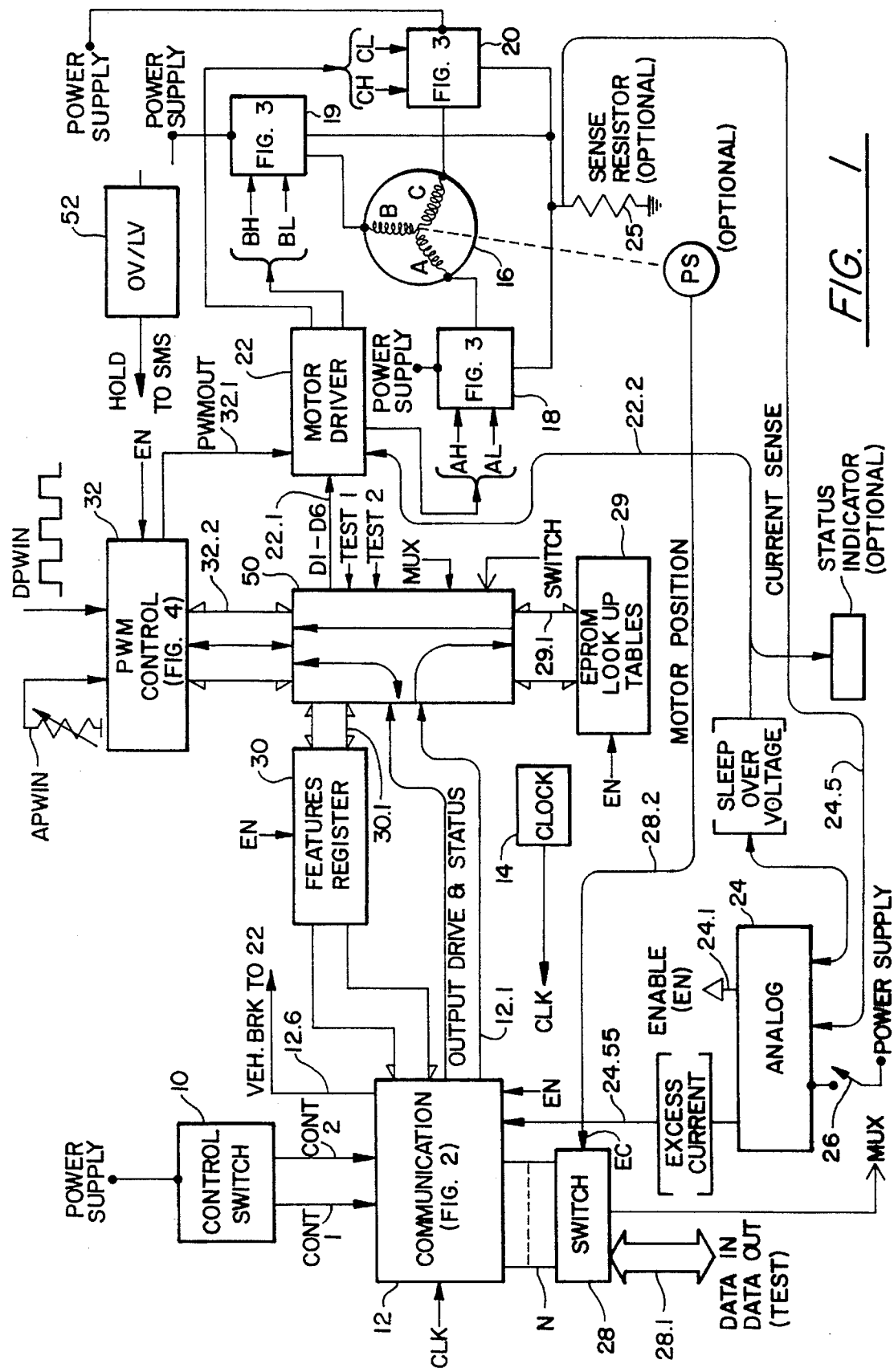
FIG. 1 is a functional block diagram of a general purpose motor controller embodying the present invention.
Figure 3:
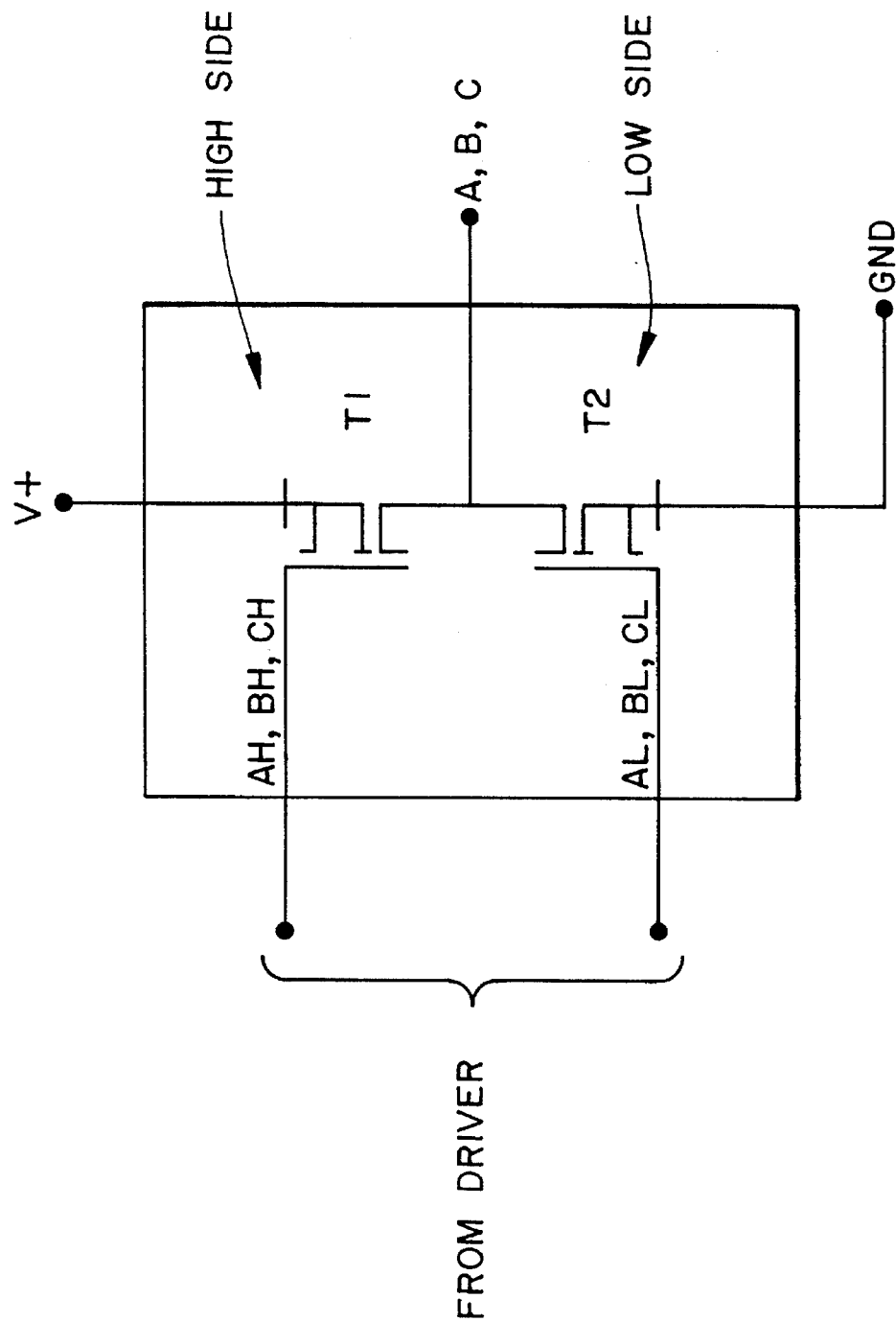
FIG. 3 is a schematic of a power MOSFET current switch used to control DC motor current on the high and low sides of Wye wound three phase DC motor shown in FIG. 1.

Turning attention to the system that is shown in FIG. 1, a primary control switch 10 (e.g. a vehicle motor on/off and direction) is connected to a DC voltage POWER SUPPLY (e.g. 12 volts) and when operated provides a pair of signals CONT1 and CONT2 (motor control 1 and motor control 2) to a communication block 12, which receives a clock signal CLK from a system clock 14. Signals CONT1 AND CONT2 are used to control the direction of a DC motor 16, and turn it on or off (and as explained below the state of one state machine). The motor is powered from the same POWER SUPPLY and has three windings A, B, C; however, the motor and GPMC supply voltages can be different because the GPMC controls current to separate motor drive switches. For instance, the input signals to the GPMC can be at TTL levels (0–5 volts) while the GPMC supply may be 12 volts. It will be seen that each winding has a current switch 18, 19, 20. Each switch contains a pair of MOS FETs T1 and T2 (see FIG. 3), one providing power from the winding's high side (from the supply), the other through the low side (to ground). For that purpose, each pair of FETs is supplied with two signals, AH and AL for the drive 18, BH and BL for the drive 19 and CH and CL for the drive 20. The two signals are supplied from a current driver 22 which is controlled by a multiplexer MUX over the bus (parallel data line) 22.1. The MUX is a conventional solid state switch that is capable of directing signal to selected MUX outputs depending upon signal addresses. The MUX acts as switch directing drive signals D1–D6 for the motor drive 22 that are generated by other blocks, as explained below. Over the lines 22.1, the drive also receives an OVERVOLTAGE signal and SLEEP signal from an analog conversion unit 24, which is enabled by the operation of a switch 26, also connected to the POWER SUPPLY, producing the ENABLE signal for the system on line 24.1. For present purposes it should be understood that the drive will enter the sleep mode in response to the SLEEP signal, a condition where the POWER SUPPLY is connected to the drive but the drive simply does not respond to the signals D1–D6 from the MUX. The purpose of the sleep mode is to reduce the power consumption of the GPMC when it is not in use. This prevents unnecessary battery drain when a vehicle is parked. All functions of the GPMC are shut-off when in response to the SLEEP signal.

The system includes an EPROM 29 (lookup tables) to determine motor operating characteristics based on signal status elsewhere in the system as accessed (addressed) through over the MUX. The EPROM receives and provides this data over the line 29.1 and contains motor speed dictation data for the motor 16.

The communication block 12 provides an interface between an N input line switch 28 and a programmable memory EPROM 30 that performs the function of a motor "features register". The features register or features memory identifies the motor type, its performance characteristics and how it should operate in response to signals inherently generated by the system through built-in programming, primarily in state machines that are part of the function blocks. The features memory, in other words, contains certain operating parameters for the specific motor 16 in a specific vehicle application. For instance, the system contains a pulse width modulator (PWM) control 32 which is intended to control the duty cycle of the drive signals, to control motor speed. But the system may or may not respond to the PWM signals depending upon features programmed into the features register. In addition, the PWM control 32 can receive externally supplied PWM signals DPWM and a analog signal APWM on the line 32.2 (the value of the resistor Rp) and generate its own signals to produce the PWMOUT signal on the line 32.1 that goes to the motor drive 22. That signal controls motor speed. Whether the system responds to the either input depends on the contents of the features register 30. Basically, the PWM control 32 will produce a pulse width modulation signal that is supplied to the MUX based on the resistor value Rp or the duty cycle of the pulses that comprise the DPWM signal. With either signal, the EPROM 29 is addressed through the MUX to provide the correct instantaneous value for PWM out (i.e. motor speed).

Programming the features register 30 takes place through the switch 28, which is placed in one position to receive data over the data lines 28.1, which is appropriately applied to addressable memory locations in the features register. Then the switch is returned to its normal position, and, in its normal position, permits motor position information on the line 28.2 to be applied to the digital section 12 from a position sensor PS. A process is described below by which the program status in the memories can be "read out" through the switch, as well, for the purposes of verifying the program data.

Figure 4:
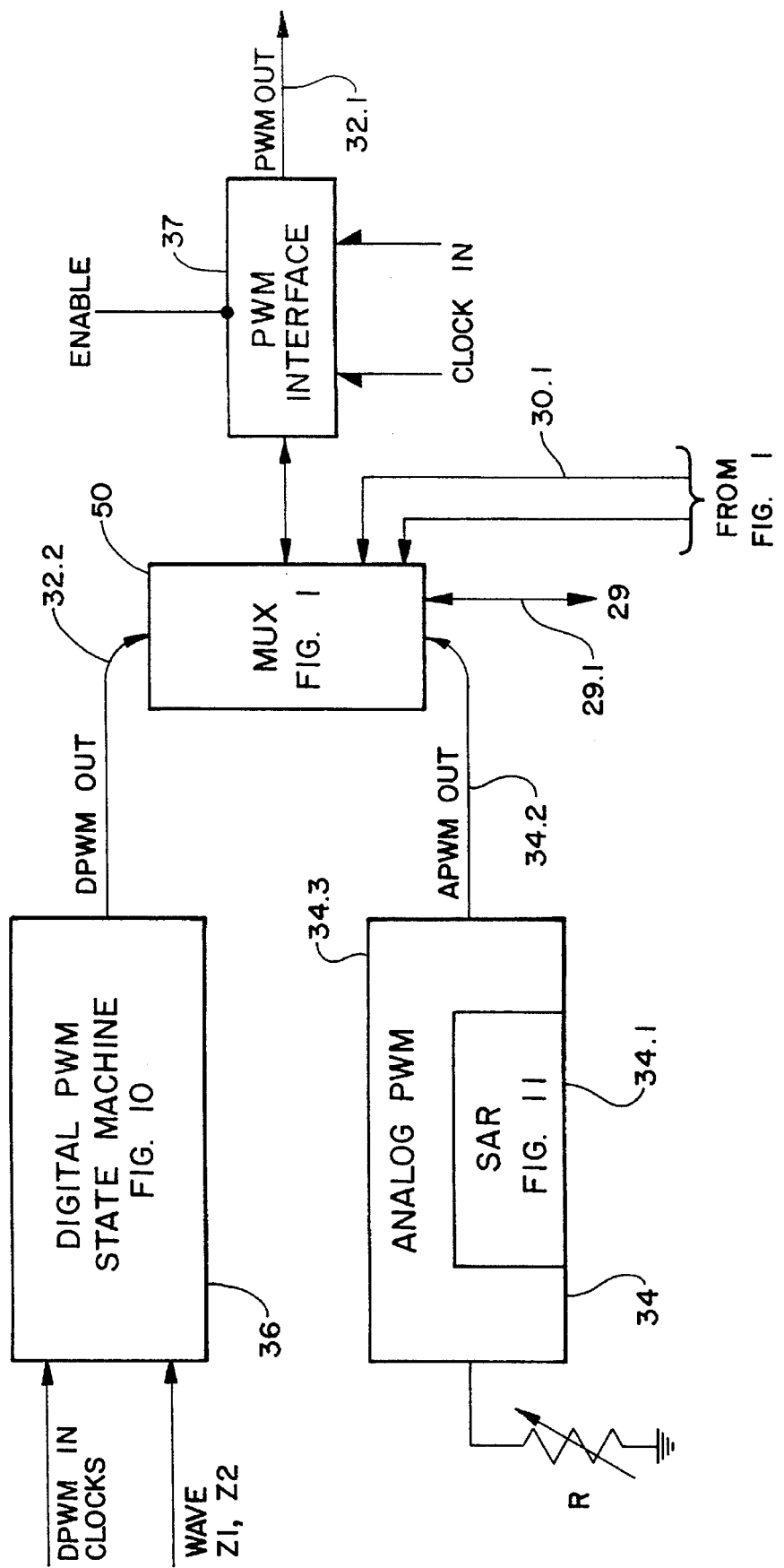
FIG. 4 is a functional block diagram of a PWM function section or block shown in FIG. 1.
Figure 10:
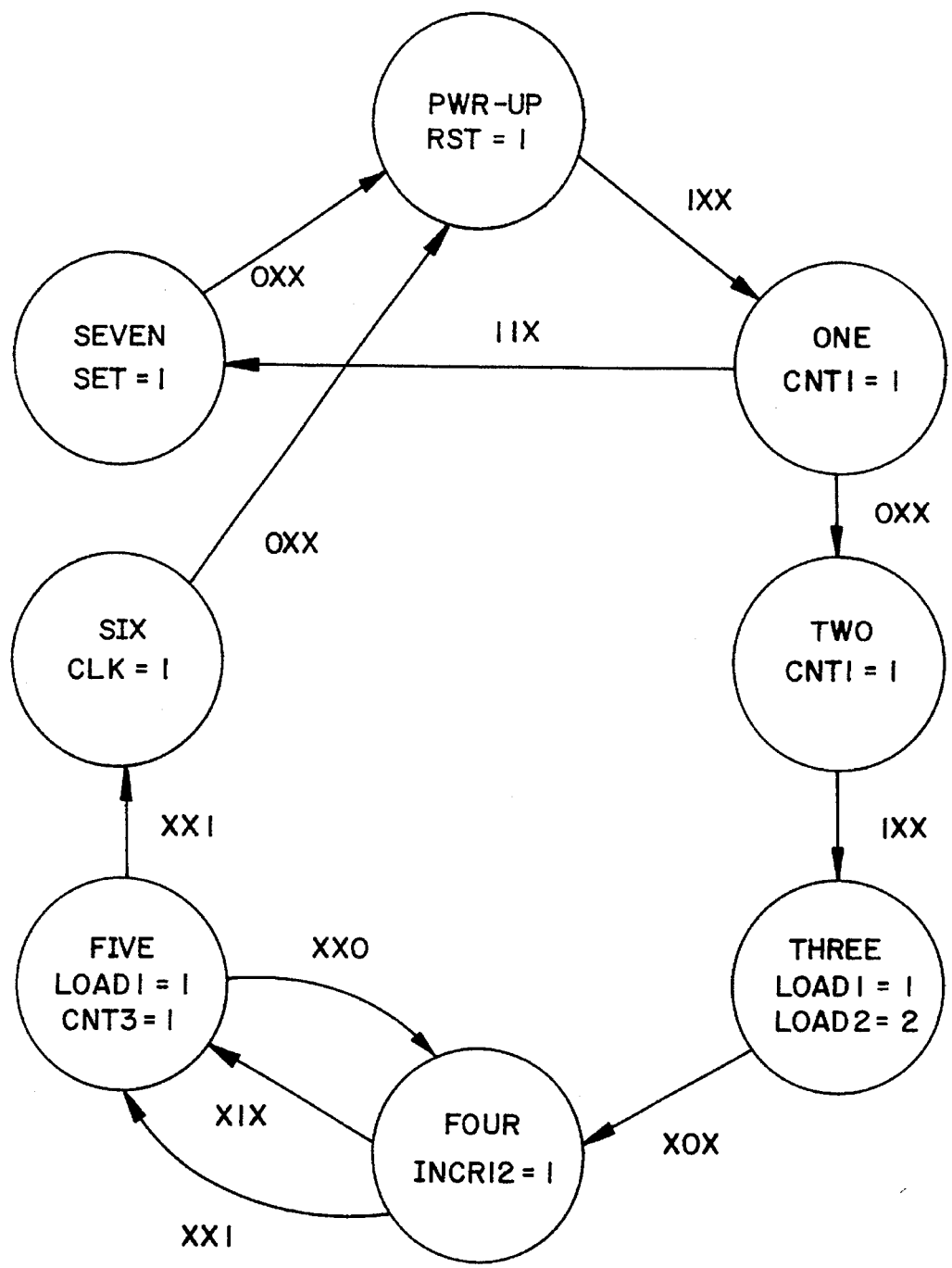
FIG. 10 is a state diagram for the digital PWM (pulse width modulation) state machine shown in FIG. 4.

When the external PWM signal is present on the line 32.1 or 32.2, the PWM control produces an address signal on the bus 32.2 manifesting the duty cycle of the PWM signal. The address is applied through the MUX to address the features register 30, which outputs the proper signals to dictate motor current for the magnitude of the PWM signal. The MUX uses that output to vary the drive signals D1–D6 (each for one transistor T1 or T2 in FIG. 3) to the drive on the line 22.1, a process that controls motor winding 16.1 current levels and direction. As observed before, such current control is well known in motor design. As FIG. 4 demonstrates, the PWM control contains an analog PWM circuit 34 and a digital PWM 36, both supplying the MUX. The digital PWM runs on a state machine engine that follows the state diagram shown in FIG. 10, where it will be noted the outputs RST, CNT1, LOAD1, LOAD2, INCR12, SET AND CONT3 have discrete values determined by the state of the inputs to the WAVE, Z1 AND Z2. The analog PWM has an SAR (successive approximation register) 34.1 and produces a six bit output signal on the line 34.2 that indicates the PWM duty cycle, which is variable as function of the adjustable resistor. The SAR is used in conjunction with a comparator (not shown) to convert the output of an analog PWM section to a digital address (on the line 34.2) that is used to access the features register 30 via the MUX. Referring to FIG. 11, the SAR operates by making a guess at the value of the analog signal and producing an output to the comparator as PSAR<5..0> outputs. The comparator compares the guess with the actual analog value. The comparator then indicates to the SAR that the guess was either high or low as a PWMCOM output. If the SAR value is too high then the SAR tries a lower guess. If the guess is too low, the SAR tries a higher guess. This cycle continues until the SAR has produced a full six bit approximation of the analog signal. A STATUS output is then set high and the current values of the PSAR<5..0> outputs are latched into the APWM<5..> outputs. The STATUS output goes to the MUX block as the APWM (analog pulse with modulation). The STATUS output indicates to the MUX block that the APWM<5..0> outputs from the SAR are valid. The PWM interface 37 receives instructions from the MUX to produce the PWMOUT signal on the line 32.1.

The MUX 50 (multiplex data path) serves as an interface between the EPROM 29, output driver 22 and the other control logic in the system—in effect, a central switch for data outputs on the blocks to which it is connected, e.g. the communication block 12. The operation of the block is broken down into four modes. These modes are the NORMAL mode, WRITE mode, READ mode and the TEST mode. The block is usually operated in the NORMAL mode. The mode that is determined by the status of lines test 1 and test 2. In the NORMAL mode, the block takes its input from either the digital or analog PWM and uses this input to generate an address to the EPROM look-up table 29. The input from the PWM 34,36 (FIG. 4) consists of a six bit decoded signal (e.g. APWM) that describes the duty cycle of the input to the PWM block or the value of the resistance Rp. This signal is then used as an address to the EPROM, which provides six bits of data to the used the PWM interface in order to generate the proper duty cycle to allow the motor to operate at the desired speed. The EPROM may be a 24×17 bit programmable memory array. The first 16 rows are used as a lookup table for the motor speed profile. This 24×16 bit portion may be broken up into sixty four 6 bit words.

In the WRITE mode, the block is used to program the EPROM with the external inputs CONTROL1 (CONT1) and CONTROL2 (CONT2) serving as memory enable and clocking for the EPROM.

In the READ mode, the block is used simply to look at the lookup table. In the TEST mode, the block is used to examine the PWM addresses generated by the digital and analog PWM circuits.

Figure 2:
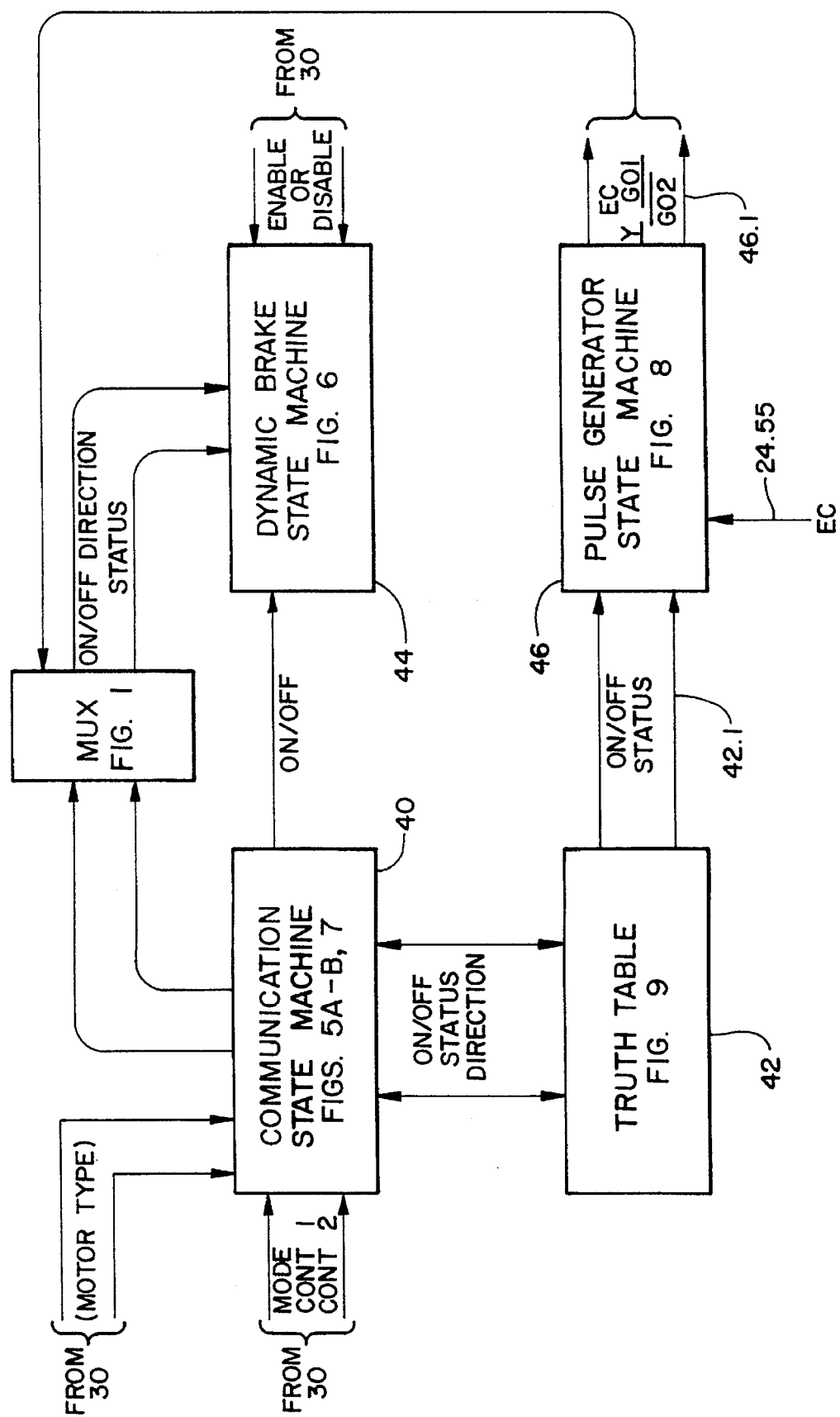
FIG. 2 is a functional block diagram of a communication section or function block shown in FIG. 1.

FIG. 2 provides additional detail on the digital or communication functional block. There, it will been that there is that has a state machine engine 40 operating according to the state diagram shown in FIGS. 5A–5B and FIG. 7. The specific states are not considered important beyond helping demonstrate that through the use of one state machine it is possible to put the system into different modes of operation based on a few inputs, in this case MODE, CONT1, CONT2, PWMOUT. Correspondingly, a logic block 42 ( see FIG. 9) serves as a commutation logic by which a selection is made of operating sequences and direction for one of seven different motor types:

1) Two phase Unipolar with 1 hall detector;

2) two phase unipolar using two hall detectors;

3) three phase unipolar Wye connected;

4) three phase bi-polar Delta (type 1);

5) H-bridge; 6) three phase hi-polar Wye; or 7) three phase b-polar delta (type 2).

Figure 8:
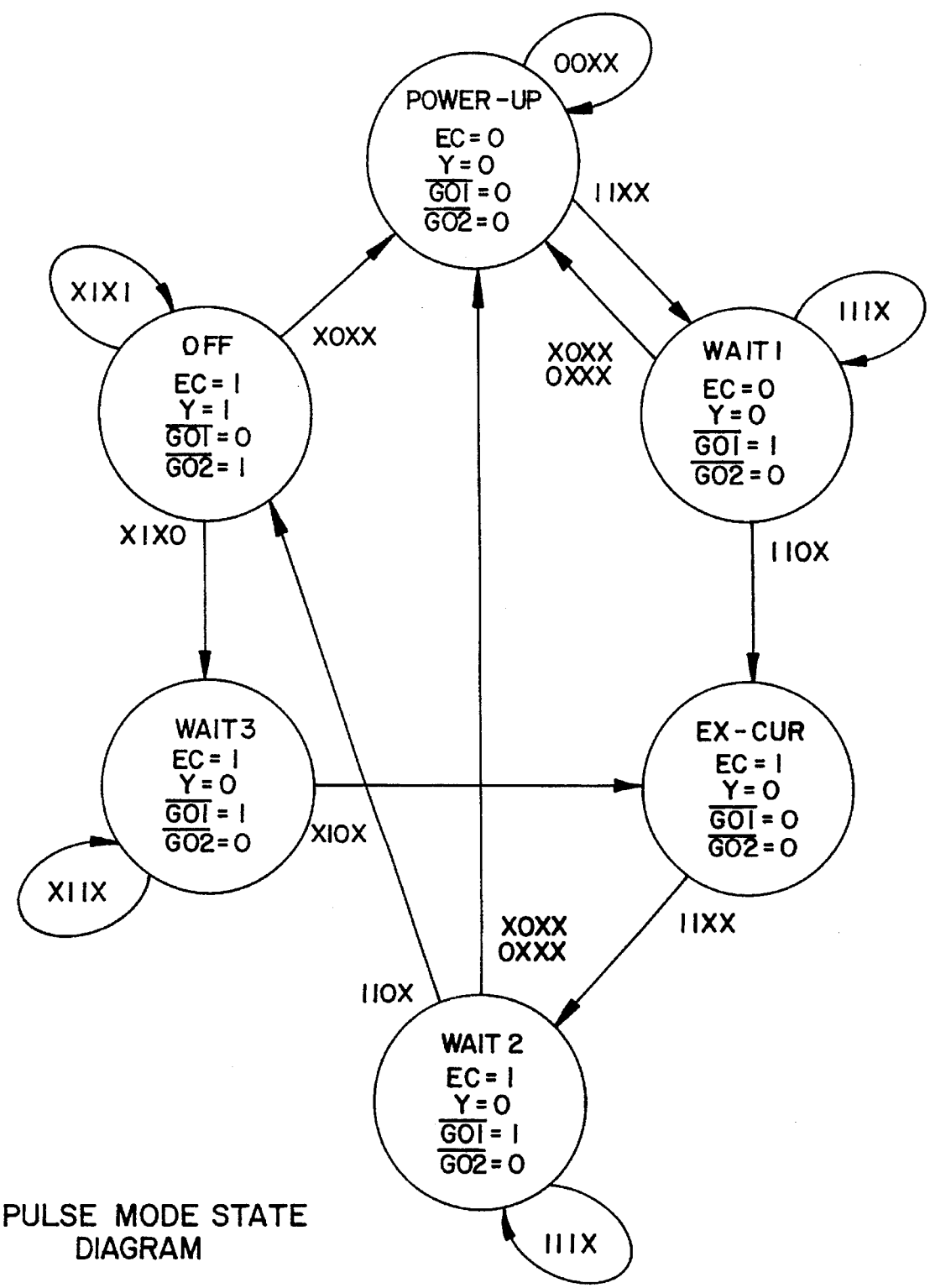
FIG. 8 is a state diagram for the pulse generator state machine shown in FIG. 2.

The motor possibilities, it will be seen, includes brushless type motors using hall detectors for sensing rotor position to synthesize commutation, a well known technique. FIG. 9, it should be noted, shows the logic for a three phase bi-polar Wye and Delta motor. It should be observed again that the outputs AH, BH, CH, AL, BL and CL refer to the signals shown in FIG. 1 that power the drives 18, 19, 20. A dynamic braking state machine 44 is included in FIG. 2. The pulse generator block 46 runs on a state machine engine that follows the state diagram shown in FIG. 8. The pulse generator circuit 46 is used on conjunction with the current sense feature to limit the power dissipation in the motor and thereby limit the temperature rise in the motor while allowing the motor to produce torque.

Figure 6:
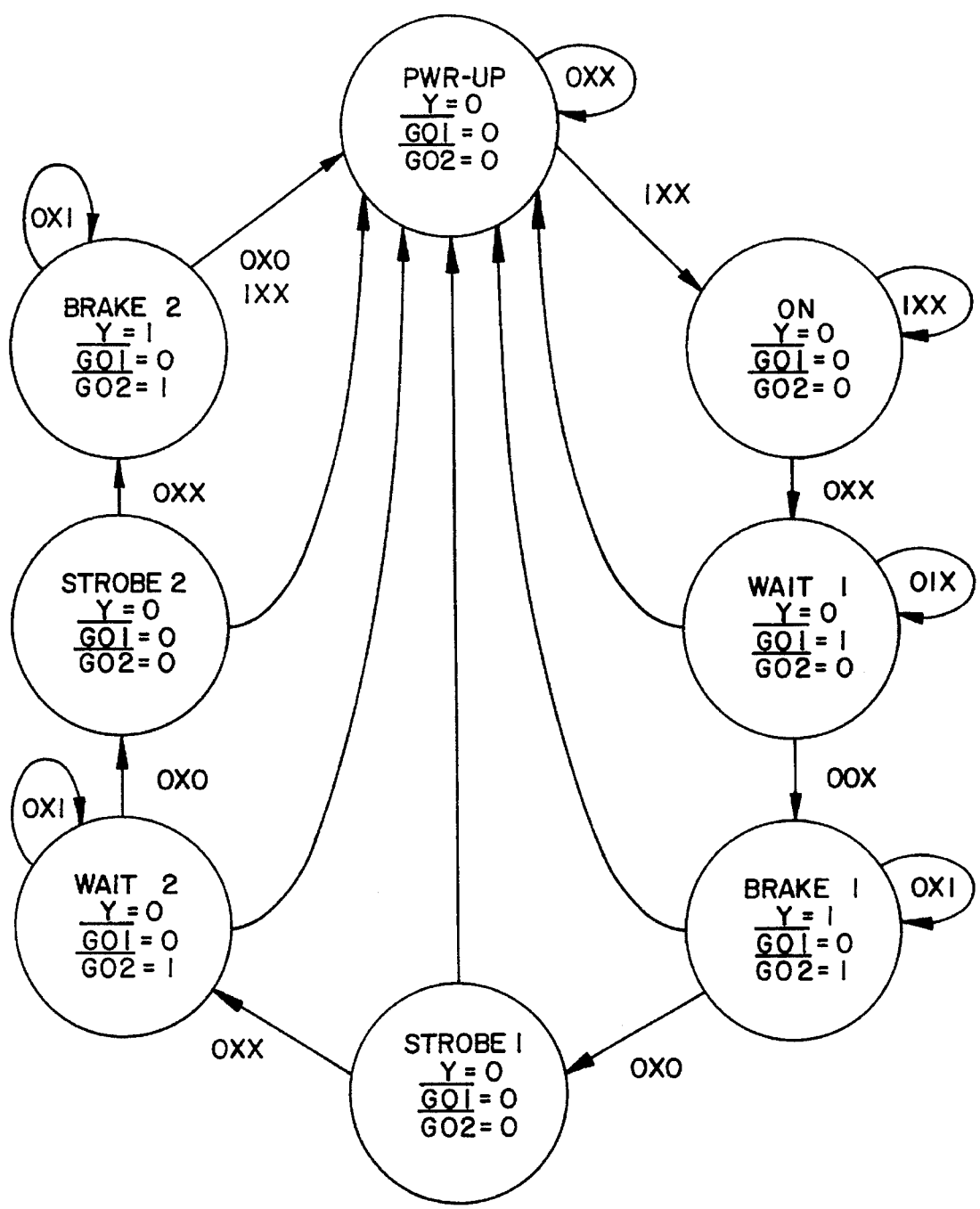
FIG. 6 is a state diagram for the dynamic braking block shown in FIG. 1.

The dynamic braking block 46 has a state machine engine, that follows the chart shown in FIG. 6. The dynamic brake block provides the logic to allow motors to be braked by turning the low side drivers (FETs T1 and T2) on and off while the high side drivers are completely off. This block 46 provides automatic dynamic braking, although both commanded and automatic dynamic braking are available with the GPMC, depending upon the mode of motor operation. Commanded dynamic braking can override automatic braking and is always enabled if the proper communication protocol is active, i.e. the "vehicle" state shown in FIG. 5A. The automatic dynamic braking is enabled from the ENABLE input, which comes from the features register 30. This enables the state diagram shown in FIG. 6. In other words, the state in FIG. 6 is not entered without the enable signal from the features register 30. In FIG. 2 it can be seen that the state machine 44 is controlled by the active low input ON_OFF and is implemented as shown in the diagram FIG. 8 as function of the inputs on lines 42.1 and 24.55. (When the communication state machine dictates a motor off condition, so that the on/off line goes low, that starts the dynamic braking sequence.) The automatic dynamic braking sequence is initiated by an OFF command from the block 40 (via the MUX). This active low input turns off all drivers and starts a 6 msec timer. After 6 msec have elapsed, all of the low side drivers are turned on and a 24 msec timer is initiated. When the 24 msec time has expired, the low side drivers are turned off and the 24 msec timer is restarted. At the end of this 24 msec, the low side drivers are turned on and the 24 msec timer is reset and started one last time. The automatic dynamic brake sequence is completed when the timer is finished. The sequence may be summarized as follows:

1) braking sequence initiated;
2) 6 msec timer—all drivers off;
3) 24 msec timer—low side drivers on;
5) 24 msec timer—low side drivers on; or
6) braking sequence completed.

Under the commanded dynamic brake function, a brake input (VHBRK) signal on the line 12.6 will turn on the low side drivers for as long as the CONT1 and CONT2 inputs are in the proper states, a sequence that operates according to the state diagram shown in FIG. 5A. The pulse generator state machine 46 follows the diagram in FIG. 8 to control the output drivers when an excess current condition exists based on the level of the current sense signal on line 24.5, provided from the sense resistor 25. It responds to signals on the lines 42.1 and 44.1 to produce the outputs on line 46.1 that are applied to the MUX. Upon indication of excess current from the EX_I input, a time sequence is initiated. The sequence begins with an initial 95 msec delay to avoid detection of inrush currents, If after this initial 95 msec period the EX-I input still indicates the presence of excess current, the status signal (EC) is set to indicate that a problem exists. The sequence then moves into another 95 msec waiting period. If at the end of this period the excess current problem still exists the output drivers are disabled by setting the disable output signal (Y). The output drivers will remain disabled for 1.5 seconds and then are re-enabled. The sequence then goes through another 95 msec waiting period to avoid detecting inrush current and still yet another 95 msec waiting period if excess current is still being detected. If during the second 95 msec waiting period the excess current ceases, the pulse mode sequence is canceled. If at the end of the second 95 msec waiting period the excess current condition still exists, the output drivers are again disabled for 1.5 seconds. This cycle repeats until no excess current is detected or the communications protocols input (ON_OFF) forces an off state or the block is reset by the RST input. If at any time the block is disabled with EN, reset with RST or forced into an off state by the ON_OFF input, the sequence will start over from the beginning.

Figure 7:
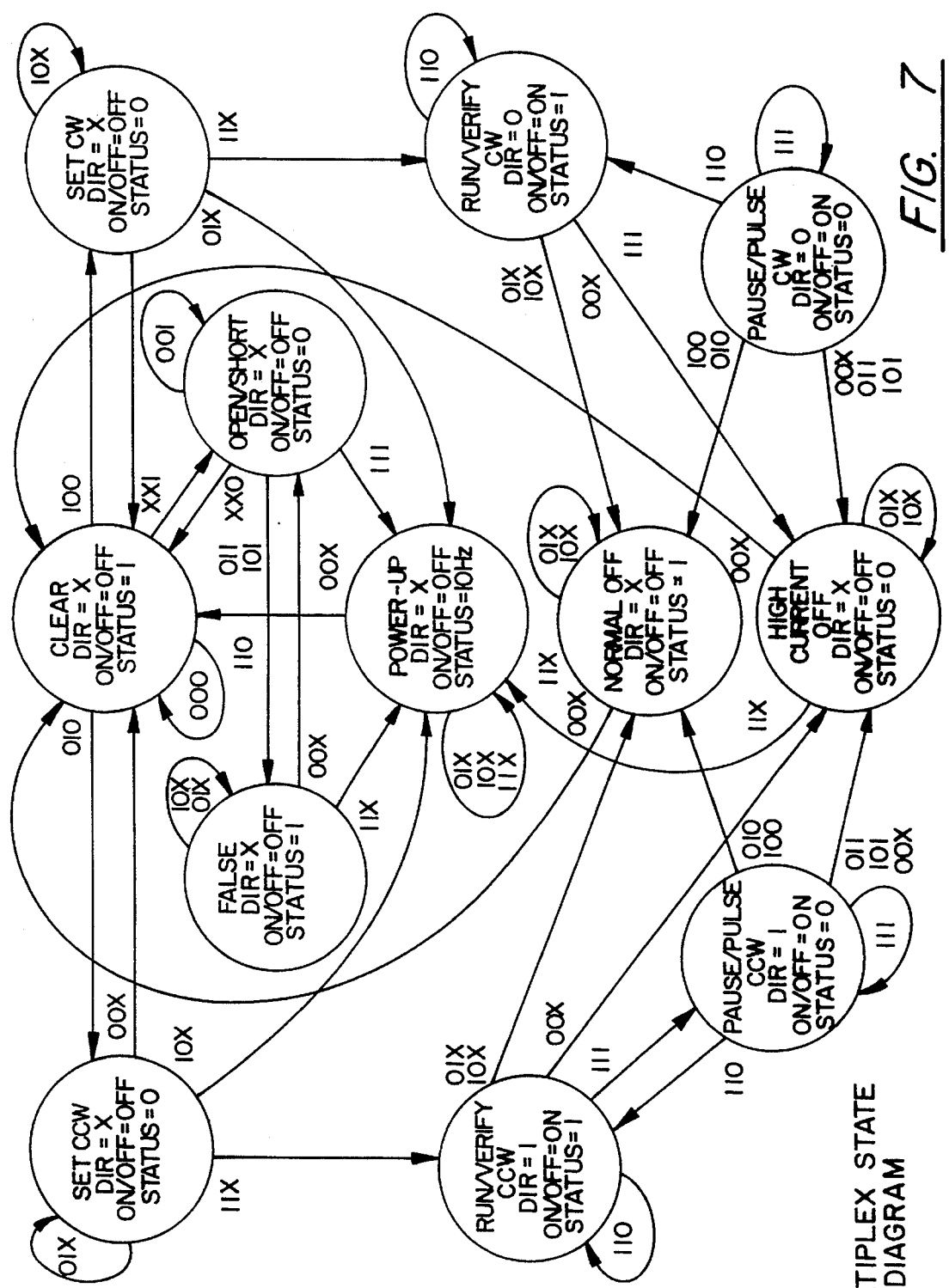
FIG. 7 is a state diagram for a state machine incorporated in the communications block shown in FIG. 2.

Referring to FIG. 7, which shows a state diagram for the MUX state machine 50, a 10 Hz (based on the CLK rate) output is provided by the STATUS signal on line 12.1 from the communication block 12 during power-up. The STATUS signal is invoked by a BLINK (not shown) signal from state machine 50. The state machine 50 (and other state machines "SMs") operates when it receives a HOLD input at logical value 0. When that value is 1, the state machine 50 is in a stand-by state (cannot change state). When the HOLD signal transitions from 1 to 0, the state machine sequences accord to the current inputs. The HOLD signal is provided from an overvoltage/low voltage (OV/LV) block 52, where a 1 value means that there is an over or under-voltage condition, placing the MUX (thereby the system) in a stand-by state. The system enters the stand-by mode because the MUX acts as the central switch for all information flow between the state machines and the look-up tables, and the other state machines are also responsive to the HOLD signal in the same way.

Referring to FIG. 7, it shows the various states when the GPMC is connected not to a simple switch 10, but a system controller that emulates the switch by providing the two control signals CONT1 and CONT2. These are the three inputs in FIG. 7 are CONT1, CONT2 and EC. (See also FIGS. 1 and 2.) Based on the state and sequence of state changes of those signals, it goes into the different modes, like it starts out in the POWER UP and then goes to the CLEAR state, regardless of the state of EC (state X). This means it is ready to take off and accept commands. Then it has to decide if it must go to SET CW or SET CCW (clockwise and counter-clockwise)depending upon whether the input is 100 or 010. Then it looks to see which line comes high first and then it knows, when it sees the second line go high, that it should go into a RUN/VERIFY state. But if the same line then goes low, it will go back to the CLEAR state. But it should also be seen that in the CLEAR state the STATUS=1, but if it goes in either of the SET states, the STATUS =1. This is a form of hand-shake signal saying that the system has been addressed, the information is received and it is ready for more information (the next command). Then it will enter the RUN/VERIFY state from a 11X command (both CONT1 and CONT2 are high) and will remain in that state as long as the input is 110. This means that it is running normally: both control lines are high and there is not a high current condition. If the EC bit changes state, meaning a high current condition, the state moves to the PAUSE/PULSE state. It should be observed that 11X moves the state to RUN/VERIFY, X being a wild card state. But then the actual state of EC is important: the state remains in RUN/VERIFY as long as EC is low (110, where 0 is the state of EC). The PAUSE/VERIFY provides a memory state of the motor direction, meaning that the master controller-(not shown)can turn off the motor while there is excess current yet have a way to remember the motor direction. It can remain in this state while remembering the motor direction. From the PAUSE/PULSE state, two other states are possible, each accessible by the codes shown in FIG. 7. The code 111 keeps the machine in the PAUSE/VERIFY state. If the EC bit returns to 0, the state moves to a NORMAL state from which the CLEAR state can entered again with the previous codes. On the other hand, if EC is high, regardless of CONT1 and CONT2 the next state is the HIGH CURRENT state, where it remains as until CONT1 and CONT2 ar both high or both low (11X or 00X). In the CLEAR state, the motor has been turned off or power has been on and both control inputs are low. In that state an XX1 code means that there is an excess current condition. Something has happened; the motor should not be on, e.g. there is a short in the harness that is causing the devices 18, 19, 20 to conduct without a motor command. This defines the OPEN/SHORT state. It can stay in that state, unless CONT1 or CONT2 goes high; then it will go to the FALSE state, meaning that it did not leave from leave from its normal off state but it has received a command to operate. Again, it should be noticed that STATUS changes between the OPEN/SHORT and FALSE states to provide the previously mention handshake to allow for subsequent commands from the system controller (not shown, as stated previously). This allows the control signals to change without turning on the motor. The GPMC will remain in the POWER-UP state until it receives a 00X command (both CONT1 and CONT2 are low), at which time it will move to the CLEAR state, mentioned before, where it can receive commands from the system controller.

Aided by the foregoing description and explanation of the invention, one skilled in the art may be able make to various modifications and other alterations to the invention, in whole or in part, without departing from the true scope and spirit of the invention.

I claim:

1. A motor control for providing signals to a motor drive to vary current in a DC motor, characterized by:
   means for providing two binary primary motor control signals to determine motor direction and initiate motor operation;
   a programmable memory containing operating characteristics for the motor;
   communication means for receiving said two primary motor control signals comprising a first state machine with a plurality of states accessed in response to the binary status of said primary motor control signals relative to each other to operate the motor in different modes associated with said operating characteristics, said communication means comprising means for supplying program data to the programmable memory in response to externally supplied signals containing said program data, the first state machine being inactive when said externally supplied signals are applied;
   pulse width modulation means comprising a second state machine responsive to a signal from the communication means to provide a pulse width modulation address signal in the presence of a pulse width modulation signal identifying either digital or analog pulse width modulation;
   means for providing said pulse width modulation signal;
   lookup table means for providing a secondary motor control signal to control motor speed in response to said pulse width modulation address signal; and
   multiplexing means for directing the pulse width modulation address signal from the pulse width modulation means to the lookup table, for receiving the secondary motor control signal from the lookup table and for directing said signal to the pulse width modulator means, said pulse width modulator means providing a variable duty cycle signal in response to said secondary motor control signal to vary current flow in the motor.

2. A motor control as described in claim 1, further characterized by:
   a switch through which programming data is supplied to or read from the communication means when the switch is in a first state and for supplying motor operating signals that control the state machine in the communication means.

3. A motor as described in claim 2, further characterized by:
   analog means for providing binary signals to the communication means in response to analog signals indicating motor operating conditions, said binary signals controlling the state of the first state machine.

4. A motor control as described in claim 3, further characterized by: the analog means comprising means for providing a signal to the motor drive to place the motor drive in a sleep state in response to a particular motor operating condition.

5. A motor control as described in claim 4, further characterized by:
   the analog means comprising means for providing a signal to inactivate the drive in response to excessive or inadequate supply voltage to the motor drive.

6. A motor control as described in claim 5, further characterized by:
   the pulse width modulation means comprising a third state machine for providing binary current signals to the multiplexing means to vary the current through the motor as function of motor operating speed curve tables stored in the look-up table and motor characteristics stored in the programmable memory.

7. A motor control as described in claim 6, further characterized by:
   the pulse width modulation means comprising means for providing different forms of pulse width modulation to control motor speed in response to motor features stored in the programmable memory and in response to the characteristics of a pulse width modulation signal received from a source separate from the motor control.

8. A motor control as described in claim 7, further characterized by;
   the pulse width modulation means comprising means for providing variable duty cycle signals based on a resistance value manifested by said pulse width modulation signal from said source separate from the motor control.

9. A motor control as described in claim 8, further characterized in that:
   the pulse width modulation means provides signals to the communication means causing the communication means to address the programmable memory and provide motor operating characteristics to the multiplexing means and the multiplexing means is responsive to the motor operating characteristics supplied by the communication means to address the lookup table and to provide motor speed control signals to the drive.

10. A motor control as described in claim 9, further characterized in that:
    the pulse width modulation means comprises a successive approximation register for providing a binary signal manifesting the duty cycle for pulse width modulated current supplied to the motor.

11. A motor control as described in claim 1, further characterized by:
    the communication means comprising:
    a communication state machine operable in a plurality of states depending on preset motor application conditions; a truth table for accessing communication protocols at different state machine states; dynamic brake means comprising a state machine with a plurality of states for effecting motor dynamic breaking in response to signals supplied from the multiplexing means when dynamic braking features are stored in the programmable memory; and means for providing dynamic brake operation to the motor in response to output signals from the dynamic brake means and the truth table.

12. A motor control as described in claim 11, further characterized by:

the communication means comprising a pulse generator comprising a state machine responsive to a binary signal from the dynamic brake means and output signals from the truth table to produce signals to control motor current during dynamic braking.

13. A method for controlling a DC motor characterized by the steps:

operating a motor control switch to provide a first pair of signals indicating motor direction and commanding motor operation;

accessing a memory containing stored data for the motor type and its operating characteristic to provide a first control signal;

applying the first control signal to a first state machine that accesses a lookup table to provide a second control signal associated with a stored motor performance table;

applying the second control signal to a second state machine if pulse width modulation motor speed is an operating characteristic stored in the memory, the state machine providing a pulse width modulation signal in response to the second control signal; and applying the pulse width modulation signal from the state machine to a motor drive that powers the DC motor in response to said first pair of signals.

14. A method as described in claim 13, further characterized by the steps:

applying a dynamic braking signal to a third state machine to produce a second dynamic braking signal, if dynamic braking is a characteristic stored in the memory; and applying the second dynamic braking to the first state machine for application to the drive.

15. A method for controlling a DC motor characterized by the steps:

applying a motor control signal to a communication unit comprising a state machine with different states manifesting different modes of motor control determined by the state of said motor control signal;

applying motor characteristic signals to the communication unit for storage in a first memory;

accessing motor features in the first memory with the communication unit identified by the control signal to select a type of speed control for the motor and using said type to provide motor speed control signal by addressing a lookup table containing basic motor operating characteristics for said type of speed control and provide, from said speed control signal, a signal to control motor current; and varying the duty cycle of current applied to the motor from a motor drive in response to said signal to control motor current.

16. The method described in claim 15, further characterized by the step:

accessing the first memory before initiating motor operation to determine the type of motor operation for the motor.

17. The method described in claim 16, further characterized by the steps:

initiating motor dynamic braking by providing a dynamic braking signal to the motor drive based on values retrieved from the lookup table if the first memory contains data indicating that the motor operates with dynamic braking.

18. The method described in claim 17, further characterized by the steps:

providing a signal that maintains the state of existing signal states when a particular operating condition is present regardless of subsequent changes in other signals.

19. The method described in claim 18, further characterized in that the operating conditions includes over and under voltage conditions.

20. The method described in claim 19, further characterized by the step:

sensing motor operating conditions and providing a signal to a communication unit for accessing the first memory and providing a signal to disable motor drive current if the operating condition does not equal a condition for the motor.

21. The method described in claim 20, further characterized by the step:

providing an enabling signal, based on power supply conditions achieving a preset characteristic, to enable the communication unit.

* * * * *

UNITED STATES PATENT AND TRADEMARK OFFICE
CERTIFICATE OF CORRECTION

PATENT NO. : 5,486,747
DATED : Jan. 23, 1996
INVENTOR(S) : David W. Welch

It is certified that error appears in the above-indentified patent and that said Letters Patent is hereby corrected as shown below:

Column 7, between lines 32 and 33, insert:

—4)  24 msec timer - all drivers off;—

Signed and Sealed this

Thirtieth Day of April, 1996

Attest:

BRUCE LEHMAN

Attesting Officer    Commissioner of Patents and Trademarks